Inventor:
Frederick W. Baumann,
by Prowell P. Mack
His Attorney.

Patented Feb. 1, 1949

2,460,729

UNITED STATES PATENT OFFICE 2,460,729

COMMUTATOR MACHINE CONTROL

Frederick W. Baumann, Schenectady, N. Y., assignor to General Electric Company, a corporation of New York Application August 23, 1947, Serial No. 770,243

9 Claims. (Cl. 318—244)

My invention relates to an improvement in dynamoelectric machines and more specifically to a dynamoelectric machine of the alternating-current type which may be operated as an adjustable speed motor or as an adjustable frequency generator.

As is well known, it is cheaper and more efficient to transmit and utilize electric power when so-called alternating currents are employed, but rotating dynamoelectric machines of the type adapted to be used on alternating current systems usually lack the readily controllable flexibility of similar machines adapted to operate in conjunction with direct-current power systems.

Heretofore means such as complicated control for inserting resistance in the electrical circuit of stator or rotor windings, or for relatively shifting the mechanical position of commutating brushes, have been used in an effort to make alternating-current machinery adaptable to the great class of work conventionally performed by direct-current machines. However, such methods have presented disadvantages among which have been the complexity and expense of construction, maintenance, and operation of the requisite accessory equipment.

It is an object of this invention to provide simple and inexpensive means for overcoming these difficulties and for achieving a high degree of flexibility of operation and control in rotating machines adapted to operate in conjunction with alternating-current power systems.

Broadly, the means employed in the embodiments illustrated and described in the present application comprise a dynamoelectric machine having at least one stator winding and a commutated rotor winding closed through brushes and a saturable core device upon itself. The saturation of said device is controlled by an adjustable direct current to give either an adjustable speed motor or an adjustable frequency generator action.

Figure 2:
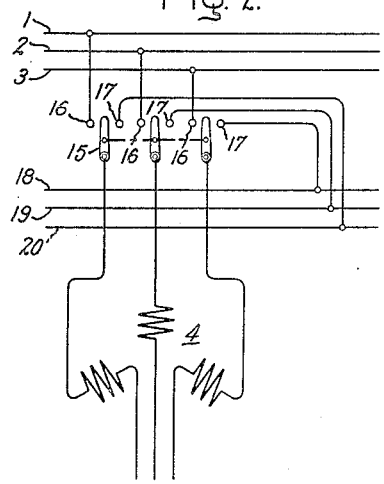
Figure 3:
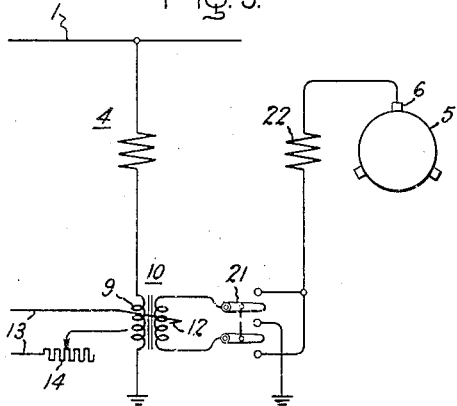
Figure 4:
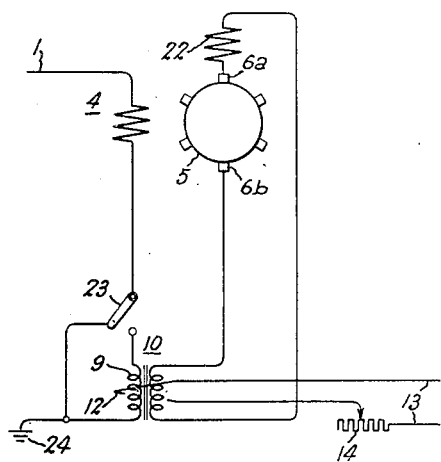
Figure 5:
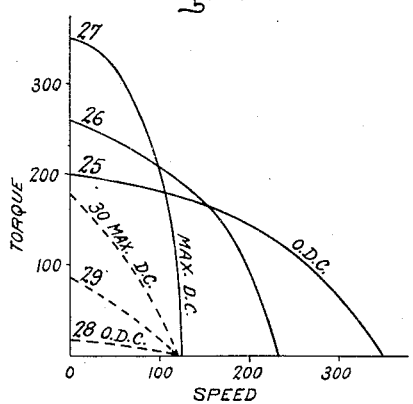

Other aspects of the invention will appear from consideration of the following description taken in connection with the accompanying drawing. In the drawing, Fig. 1 diagrammatically represents an embodiment of my invention applied to an adjustable speed motor, Fig. 2 represents a modification of Fig. 1 to adapt the same machine for operation as an adjustable frequency generator, Fig. 3 represents another embodiment of my invention applied to an adjustable speed motor, Fig. 4 represents still another embodiment of my invention applied to an adjustable speed motor, and Fig. 5 represents a series of speed torque curves indicating the operation of the motor diagrammatically represented by Fig. 4.

Figure 1:
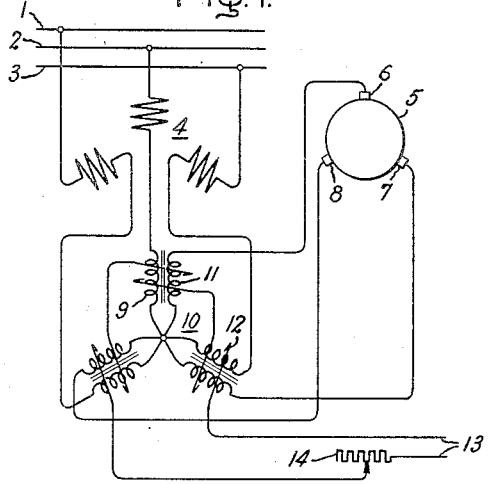

In Fig. 1 I have diagrammatically represented a polyphase motor supplied by a line comprising wires 1, 2 and 3 connected to a stator power winding 4. The motor has a commutated rotor winding which with its cooperating commutator is diagrammatically represented in the drawing by the circle 5. A set of brushes 6, 7 and 8 contacts the commutator in a three-phase arrangement, the brushes being positioned on the commutator 120 electrical degrees apart. Stator winding 4 is shown as an open Y winding with one end of each phase of the winding connected to the line wires and the other end to the primary winding 9 of a saturable core transformer 10. Secondary winding 11 of the saturable core transformer is connected to the brushes 6, 7 and 8 thereby to close the rotor winding upon itself. To provide the saturable core feature, the transformer is provided with a tertiary or saturating winding 12. Winding 12 is connected to a source of direct current supply 13 through an adjustable resistance or rheostat 14. The saturable device windings 9, 11 and 12 are all inductively coupled by a common magnetic core. It is immaterial whether all three are wound on the same leg or whether they are wound on different legs of the common core. The saturable core transformer 10 is a control device which need not form an integral part of the dynamoelectric machine and can be mounted at a distance therefrom if desired.

The principle of operation may be described as follows: An ordinary induction motor runs at its so-called inherent speed below synchronism in order to generate a slip voltage in its rotor which causes a current flow therein, thus producing the necessary driving torque. If a voltage having rotor frequency is impressed on the rotor in opposition to the rotor voltage the speed decreases further below synchronism to enable the rotor to cut the magnetic flux at a faster rate so that the increased rotor voltage can balance the opposing voltage and supply the voltage drop in the rotor winding so as to maintain the necessary driving torque. If the impressed voltage is reversed, thereby assisting the rotor voltage, the speed will increase above its inherent value since the rotor need not generate all the voltage necessary to create the driving torque, and if this impressed voltage is of sufficient value, the speed will rise above synchronism. Those skilled in the art are familiar with the fact that if a voltage (having the frequency of voltage applied to the stator winding) is applied to brushes properly positioned on the rotor winding commutator, voltage of rotor frequency is supplied to the rotor, the commutation process changing the frequency to the required value.

Therefore, the secondary winding 12 of the saturable core transformer of Fig. 1 is connected to the brushes 5, 6 and 7 to provide a voltage which bucks or boots the rotor voltage in an amount proportionate to saturation provided by adjustment of resistance 14. Voltage provided by line wires 1, 2 and 3 will be divided between stator winding 4 and transformer primary winding 9, and the division of this total voltage will depend on the relative magnetizing reactance of the saturable core transformer primary with respect to the magnetizing reactance of the stator winding 4. When saturable transformer 10 has no direct current power applied to it, the principal voltage drop will occur across the transformer. If, however, the transformer is saturated, the principal voltage drop will occur across the stator winding 4. With full saturation and the principal voltage drop across winding 4, the machine will operate essentially as an induction motor with the brushes substantially short-circuited. With no saturation the principal voltage drop will occur across the transformer 10 and an additional voltage will be supplied to the rotor 5 from the secondary winding of the transformer and the speed of the motor will increase above synchronism.

By any means, such as a reversing switch in each phase of the transformer secondary circuit (not shown in Fig. 1), the voltage applied to the brushes may be made to buck instead of boost or alternately buck and boost so that a wide range of speed can be obtained. It has been assumed that the supply source derived from phase lines 1, 2 and 3 is of constant frequency, such as 60 cycles, but the invention is also useful if the frequency of the supply is variating and it is desired to have the motor operate at a relatively constant speed. With the arrangement shown in Fig. 1, the speed may be adjustably held constant in such a case by manipulation of the rheostat 14, but the motor described is still operating as an adjustable speed motor.

In Fig. 2 I have shown a modification involving only the connection from the line wires to the stator winding 4 of the dynamoelectric machine of Fig. 1. With the connections shown in Fig. 2 the same machine is made adaptable for use as a generator. A power source such as phase lines 1, 2 and 3, which may be of any frequency, is used to provide a shot of initial excitation to the stator winding 4 by moving the selector switch device 15 to one position, such as to contact buttons 16, to connect the stator winding with the three-phase supply of lines 1, 2 and 3. Since it is assumed that the generator is being driven by an outside source of mechanical power, this initial excitation causes voltage to build up and after this initial energization, switch device 15 may be moved to contact buttons 17 and provide power to the output line wires 18, 19 and 20. By adjustment of the saturation on a device such as the saturable core transformer of Fig. 1, the frequency of the output at the lines 18, 19 and 20 may be varied although the speed of the generator is constant, or, if desired, the frequency may be adjustably held constant although the generator is driven at a variating speed as might be the case if it were driven as an auxiliary to an aircraft-propelling engine. The principle of operation of the machine when used as a generator will be clear to those skilled in the art by analogy to the motor embodiment of Fig. 1 and by analogy to the generator operation described in my copending application, Serial No. 770,242, filed August 23, 1947, now Patent No. 2,457,517, issued December 28, 1948, and assigned to the assignee of the present invention.

In Fig. 3 I have shown another embodiment of my invention. A one-line diagram is used, although it is assumed that the machine is a three-phase machine operating from three power lines, one of which is represented by line 1. Connection is made from the line to stator power winding 4 and through it to primary 9 of saturable core transformer 10, the saturation of which is adjustably controlled from an adjustable D. C. supply comprising line 13 and rheostat 14. The secondary winding of the saturable core transformer, for each phase, is connected to a reversing switch 21 which obviously may be thrown in one position or the other to reverse the direction of current flow from said transformer secondary winding to brush 6 and thence to rotor winding 5. In the embodiment shown in Fig. 3 a compensating winding 22 (of which there is shown only a single phase of an assumed three-phase open star-connected winding) has been provided in series between the reversing switch and the commutated rotor winding 5. Compensating winding 22 is arranged to magnetically oppose armature winding 5 so that the total reactance of armature and compensating winding is small, thus aiding in reducing the amount of D. C. control power required to adjust the output of the machine. In actual test a three-phase, three-H. P. motor having a synchronous speed of 1800 R. P. M., and connections similar to those shown in the one-line diagram of Fig. 3, was adjustably operated with practically stepless speed control over a range from 0 R. P. M. to 3000 R. P. M. with a maximum D. C. control input of only 40 watts.

In Fig. 4 I have shown a one-line diagram intended to depict a three-phase arrangement for a motor having a commutated rotor winding 5 with six brushes spaced at 60 electrical degrees for a three-phase arrangement. There are thus, per phase per pair of poles, two brushes such as $6a$ and $6b$. As before, the stator power winding 4 is supplied by line wires such as 1, but in the embodiment in Fig. 4 a selector switch 23 is used to alternately connect the midpoints of the phases of power winding 4 in series with the primary of the saturable core device 10 or directly to the neutral or ground connection 24. The secondary winding of the saturable core device is connected in series with the commutator brushes with a compensating winding 22 in series in the same circuit. A direct current supply 13 is used through an adjustable rheostat means such as 14 to control saturation of device 10. It should be noted that with the transformer primary winding 9 connected in the circuit in series with stator winding 4, device 10 operates as a saturable core transformer and with the primary winding disconnected the device 10 acts as a saturable core reactor so that regardless of the position of selector switch 23 the degree of saturation will affect the passage of current in the rotor circuit.

With the selector switch in the position which puts transformer primary winding 9 in series with stator power winding 4, the device will operate substantially the same as the embodiment shown in Fig. 3. With the selector switch in the other position primary winding 9 is inoperative and regulation of rheostat 14 will give inching speeds below synchronism, for although no bucking or boosting voltage is supplied to the rotor, the degree of short circuit of the brushes is thereby controlled.

In Fig. 5 I have shown a series of curves depicting the operation of the motor diagrammatically illustrated in Fig. 4. In the graph of Fig. 5 the abscissae are speed, expressed as a percentage of base speed of the motor, and the ordinates are torque, expressed as a percentage of the normal torque at base speed. The three solid curves 25, 26 and 27 represent the speed-torque curves obtainable when the position of switch 23 is such that the stator power winding 4 is in series with saturable core transformer primary 9. Curve 25 represents values obtainable with 0 D. C. control current, curve 27 represents values obtainable with the maximum D. C. control current, and curve 26 represents values obtainable with an intermediate adjustment of control rheostat 14. Dotted curves 28, 29 and 30 represent values of inching speed torque characteristics obtainable when selector switch 23 is thrown over to connect stator power winding 4 to neutral to bypass transformer primary winding 9. Curve 28 represents values obtainable with 0 D. C. control current, curve 30 represents values obtainable with maximum D. C. control current, and curve 29 represents values obtainable with an intermediate adjustment of control rheostat 14.

Of course with minor modifications such as those shown in Fig. 2, any of the motor embodiments described may be employed for generator applications.

There is thus provided a device of the character described which is capable of meeting the objects hereinabove set forth, and there is provided a machine capable of acting as an adjustable speed motor or an adjustable frequency generator.

While I have illustrated and described particular embodiments of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States is:

1. An alternating-current dynamoelectric machine having a stator and a rotor, a winding on said stator adapted by connection to a line to act as a power winding, a commutated winding on said rotor, brushes contacting the commutator of said commutated rotor winding, a saturable core device comprising at least two windings arranged about a common magnetic core, means including an adjustable supply of direct current connected to one of said device windings for adjustably varying the degree of saturation of said core, and means including connections from said commutator brushes to the other of said device windings for closing the circuit of said rotor winding and for varying the impedance in the external circuit of said rotor winding, whereby adjustment of said direct current supply may be made to affect the operating characteristics of said dynamoelectric machine.

2. An alternating-current dynamoelectric machine having a stator and a rotor, a stator power winding for connection to a source of alternating current, a commutated rotor winding, commutator brushes, a saturable core transformer comprising primary and secondary alternating current windings and a tertiary direct current winding, means including a direct current supply and a rheostat for adjustably varying the excitation of said tertiary winding, means including connections from said stator power winding to said transformer primary winding and connections from said transformer secondary winding to said commutator brushes to supply a voltage of rotor frequency to said rotor winding, whereby the characteristics of said dynamoelectric machine may be varied by adjustment of said rheostat.

3. An alternating-current dynamoelectric machine having a stator core and a rotor core, a stator winding on said stator core, a commutated rotor winding on said rotor core, commutator brushes cooperating with said rotor winding, a saturable core transformer comprising primary and secondary alternating current windings and a tertiary direct current winding, means including an adjustable direct current supply connected to said tertiary winding for adjustably varying the excitation thereof, means including connections to said transformer primary winding for supplying an alternating current thereto, means including connections from said transformer secondary winding to said commutator brushes to supply a voltage of rotor frequency to said rotor winding, and means for causing said voltage supplied to said rotor winding to selectively buck and boost normal rotor voltage.

4. An alternating-current dynamoelectric machine having stator and rotor members, a stator power winding on said stator member, a commutated rotor winding on said rotor member, commutator brushes cooperating with said rotor winding, a saturable core device, means including an adjustable direct current supply for varying the saturation of said device, means including connections from said device to said commutator brushes to close the circuit of said rotor winding, means including a second stator field winding connected in the circuit between said saturable core device and said brushes to act as a compensating winding arranged to magnetically oppose the rotor winding so that total reactance of rotor winding and compensating winding is relatively small.

5. An alternating-current motor having a stator and a rotor, a stator power winding, a commutated rotor winding, commutator brushes, a saturable core device comprising a tertiary direct current winding arranged about the core thereof and also comprising primary and secondary alternating current windings arranged about the common core of said device, means including an adjustable supply of direct current for adjustably varying the saturation of said device, means for energizing said device primary winding, means including connections from said device secondary winding to said commutator brushes for impressing a voltage on said rotor winding, and means including a stator compensating winding in the circuit between said device secondary winding and said brushes, whereby the operating speed of said motor may be adjusted.

6. An alternating - current motor having a stator and a rotor, a winding on said stator, a commutated winding on said rotor, commutator brushes, a saturable core device having a primary, a secondary and a tertiary winding, means for making said primary winding responsive to voltage impressed on said stator winding, means for selectively connecting said secondary winding to said commutator brushes to cause voltage from said secondary winding to buck or boost normal rotor voltage, and means for adjustably supplying direct current to said tertiary winding to control the saturation of said device, whereby the running speed of said alternating current motor may be adjusted to values below and above synchronism.

7. An alternating-current motor having a stator and a rotor, a stator power winding, a commutated rotor winding, commutator brushes, a compensating stator winding electrically connected in series with said commutator brushes, and means for regulating the speed of said motor including a saturable core transformer, said transformer having a primary winding, a secondary winding and a tertiary winding, means including a switch to cause said primary winding to be selectively connected in circuit or out of circuit with respect to said stator power winding, said transformer secondary winding being connected in the circuit of said commutator brushes in series with said compensating winding, and means including an adjustable supply of direct current excitation connected to said transformer tertiary winding for adjustably varying the degree of saturation of said transformer, whereby speeds selectively below and above synchronous speed of said motor may be adjustably obtained.

8. An alternating-current generator having a stator portion and a rotor portion, a power winding on said stator, line wires adapted to deliver output from said generator, a source of independent excitation for said generator, selective means for connecting said power winding to said source of excitation for initial excitation of said generator or to said output line wires, a saturable core device having three inductively-coupled windings, one of said windings arranged to be responsive to current in said stator power winding, another of said windings connected in the circuit of said commutator brushes to impress a voltage on said rotor, and adjustable means for saturating the core of said device through said third device winding, whereby the frequency of the output of said generator may be adjusted.

9. An alternating-current generator having a stator and a rotor, a stator winding arranged by connection to line wires to act as a power winding, a commutated rotor winding, commutator brushes, a stator winding arranged by connection to said commutator brushes to act as a compensating winding, an adjustable source of direct current supply, and a saturable core device having its saturation determined by said adjustable source of direct current supply, said device being connected in the circuit of said stator power winding and the circuit of said compensating winding and commutator brushes, whereby an adjustable voltage of rotor frequency may be impressed on said rotor winding and the output characteristics of said generator may be adjusted with a high ratio of amplification of generator output to direct current control input.

FREDERICK W. BAUMANN.

REFERENCES CITED

The following references are of record in the file of this patent:

UNITED STATES PATENTS

| Number | Name | Date |
| --- | --- | --- |
| 1,219,952 | Korhals-Altes | Mar. 20, 1917 |
| 1,969,520 | Nagashev | Aug. 7, 1934 |
| 2,211,673 | Robertson | Aug. 13, 1940 |
| 2,247,313 | Schwarz | June 24, 1941 |